United States Patent
Carmena et al.

(10) Patent No.: US 10,528,673 B2
(45) Date of Patent: *Jan. 7, 2020

(54) MESSAGE TONE EVALUATION IN WRITTEN MEDIA

(71) Applicant: International Business Machines Corporation, Armonk, NY (US)

(72) Inventors: Sergio F. Carmena, Dublin (IE); John Dowling, Dublin (IE); Alex Martinelli, Dublin (IE); Daniele Riccardelli, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,354

(22) Filed: Aug. 24, 2018

(65) Prior Publication Data

US 2018/0365215 A1 Dec. 20, 2018

Related U.S. Application Data

(63) Continuation of application No. 15/813,344, filed on Nov. 15, 2017, now Pat. No. 10,152,475, which is a continuation of application No. 15/270,833, filed on Sep. 20, 2016, now Pat. No. 10,140,290.

(51) Int. Cl.
*G06F 17/27* (2006.01)

(52) U.S. Cl.
CPC .......... *G06F 17/279* (2013.01); *G06F 17/274* (2013.01)

(58) Field of Classification Search
None
See application file for complete search history.

(56) References Cited

U.S. PATENT DOCUMENTS

| | | | |
|---|---|---|---|
| 8,041,589 B1 | 10/2011 | Blair et al. | |
| 2010/0161746 A1 | 6/2010 | Pilgrim | |
| 2013/0018954 A1* | 1/2013 | Cheng | G06Q 10/00 709/204 |
| 2014/0100922 A1 | 4/2014 | Aycock | |
| 2015/0046233 A1 | 2/2015 | Srulowitz et al. | |

(Continued)

OTHER PUBLICATIONS

List of IBM Patents or Patent Applications Treated as Related, Aug. 24, 2018, pp. 1-2.

(Continued)

*Primary Examiner* — Kevin Ky
(74) *Attorney, Agent, or Firm* — Winstead, P.C.

(57) ABSTRACT

A method, computer program product and system for message tone evaluation. A message or a group of messages are retrieved between a sender entity and a recipient entity. Text content for the message or group of messages is extracted and the analysis of the tone of the text content is obtained. A graph is referenced in which nodes represent entities and edges between the nodes have tone weightings for a tone for a communication relationship between the entities. The graph is updated with a tone weighting for the retrieved message or group of messages by setting or updating an edge tone weighting between the nodes for the sender entity and the recipient entity. The graph is analyzed to obtain analysis of one or more entities and the tone weightings of their communication relationships.

10 Claims, 8 Drawing Sheets

(56) References Cited

U.S. PATENT DOCUMENTS

2015/0302328 A1* 10/2015 Zeng ............... G06Q 10/06398
                                                    705/7.38
2016/0026962 A1   1/2016 Shankar et al.
2017/0213138 A1*  7/2017 Bojja ...................... G06N 5/04

OTHER PUBLICATIONS

IBM, "Tone Analyzer: Discover, Understand, and Revise the Language Tones in Text," http://www.ibm.com/watson/developercloud/tone-analyzer.html, 2016, pp. 1-3.

IBM, "Tone Analyzer," https://tone-analyzer-demo.mybluemix.net, 2016, pp. 1-2.

IBM, "IBM Personal Social Dashboard," https://cv01a089.w3-969.ibm.com/index, 2016, one page.

Jennifer Zaino, "Sentiment Intelligence in the Workplace: Watch Your Corporate Tone!," http://www.dataversity.net/sentiment-intelligence-in-the-workplace-watch-your-corporate-tone, Jun. 22, 2011, pp. 1-8.

Office Action for U.S. Appl. No. 16/112,258 dated Apr. 17, 2019, pp. 1-37.

* cited by examiner

MESSAGE TONE EVALUATION IN WRITTEN MEDIA

TECHNICAL FIELD

The present invention relates to message tone evaluation.

BACKGROUND

In a current corporate scenario, it is difficult to capture the overall workplace interaction impression, as well as that of smaller groups or individual employees.

Tone analysis is known, for example, as provided by the IBM Watson Tone Analyzer Service (IBM and Watson are trademarks of International Business Machines Corporation). The IBM Watson Tone Analyzer Service uses linguistic analysis to detect types of tones from written text. The tone types include emotions, social tendencies and writing style. Emotions identified include anger, fear, joy, sadness and disgust. Social tendencies identified include personality traits such as openness, conscientiousness, extraversion, agreeableness, and emotional range. Writing styles identified include confident, analytical, and tentative.

A user can input email or other written media into a tone analyzer service and use the results to determine if the writing comes across with the intended tone for the recipient.

Sentiment analysis is also known which aims to identify the positive and negative sentiments within a text from natural language processing, text analysis, and computational linguistics. Sentiment analysis is used to determine the attitude of an author with respect to a topic. Tone analysis is concerned with how the writer's message comes across to a recipient.

Organizations aim to promote and maintain a positive atmosphere and recognize any problems relating to employees or departments so these can be addressed. It is often a challenge to capture insight into organization or workplace interaction tone.

Therefore, there is a need in the art to address the aforementioned problems.

SUMMARY

In one embodiment of the present invention, a method for message tone evaluation between entities in an organization comprises intercepting a message or a group of messages between a sender entity and a recipient entity in an organization. The method further comprises extracting text content for the message or group of messages. The method additionally comprises performing analysis of a tone of the extracted text content, where the tone comprises emotions, social tendencies, writing styles and sentiment of positive and negative sentiments. Furthermore, the method comprises providing a tone weighting for a communication relationship between the sender entity and the recipient entity based on the analysis of the tone of the extracted text content. Additionally, the method comprises retrieving a graph in which nodes represent entities in the organization and edges between the nodes have tone weightings for a tone for a communication relationship between the entities, where the tone weightings comprise a numerical value. In addition, the method comprises updating the graph with the tone weighting for the intercepted message or group of messages by setting or updating an edge tone weighting between the nodes for the sender entity and the recipient entity. The method further comprises analyzing the updated graph to obtain information on the tones used by the sender entity and the recipient entity. The method additionally comprises capturing an insight into an interaction tone of the organization based on the analysis.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

According to an aspect of the present invention there is provided a computer-implemented method for message tone evaluation between entities in an organization, comprising: intercepting a message or a group of messages between a sender entity and a recipient entity in an organization; extracting text content for the message or group of messages and obtaining analysis of the tone of the text content; referencing a graph in which nodes represent entities in the organization and edges between the nodes have tone weightings for a tone for a communication relationship between the entities; updating, by a processor, the graph with a tone weighting for the intercepted message or group of messages by setting or updating an edge tone weighting between the nodes for the sender entity and the recipient entity; and analyzing, by the processor, the graph to obtain analysis of one or more entities of the organization and the tone weightings of their communication relationships.

The method may include formatting a tone weighting for a communication relationship of the sender entity to the recipient entity including additional metadata relating to the message or group of messages. Updating the graph with a tone weighting may include updating the graph with the additional metadata to enable filtering of the graph by the metadata.

A tone weighting for the message or group of messages may be for a single direction of communication relationship. Alternatively, a tone weighting for the message or group of messages may be for a two-way direction of communication relationship.

Updating an edge tone weighting may average tone weightings of multiple messages or groups of messages intercepted from the sender entity to the recipient entity. Updating an edge tone weighting may provide a weighted average tone weighting, weighted by a measurement of one or more features of the message or group of messages, for example, based on the additional metadata of the message or group of messages.

Obtaining analysis of the tone of the text content may obtain analysis of a single generalized tone with a scoring ranging from positive to negative. Alternatively, obtaining analysis of the tone of the text content may obtain analysis of multiple different traits of tone and/or sentiment with a scoring for each trait. The method may include referencing multiple graphs each having edges between the nodes for a tone weighting for one of the multiple traits.

An entity may be a communication entity having a communication address within the organization and may include an individual, a group of individuals, or a role in an organization that has a communication address.

Analyzing the graph may analyze a subset of the entities based on one or more of the group of: geographic location, hierarchical relationship, departmental, and organizational relationship. Analyzing the graph analyzes one or more entities of the organization and the tone weightings of their communication tones for a time period of communications.

According to another aspect of the present invention there is provided a system for message tone evaluation between entities in an organization, comprising: a processor and a memory configured to provide computer program instructions to the processor to execute the function of the components; a message interceptor for intercepting a message or a group of messages between a sender entity and a recipient entity in an organization; a text extractor for extracting text content for the message or group of messages and a tone analysis obtaining component for obtaining analysis of the tone of the text content; a graph reader for referencing a graph in which nodes represent entities in the organization and edges between the nodes have tone weightings for a tone for a communication relationship between the entities; an edge weight updating component for updating the graph with a tone weighting for the intercepted message or group of messages by setting or updating an edge tone weighting between the nodes for the sender entity and the recipient entity; and a graph analyzer for analyzing the graph to obtain analysis of one or more entities of the organization and the tone weightings of their communication relationships.

The system may include a tone formatting component for formatting a tone weighting for a communication relationship of the sender entity to the recipient entity including additional metadata relating to the message or group of messages. The edge weight updating component may update the graph with a tone weighting including updating the graph with the additional metadata to enable filtering of the graph by the metadata.

The edge weight updating component may average tone weightings of multiple messages or groups of messages intercepted from the sender entity to the recipient entity. The edge weight updating component may provide a weighted average tone weighting weighted by a measurement of one or more features of the message or group of messages.

The tone analysis obtaining component may obtain analysis of a single generalized tone with a scoring ranging from positive to negative or may obtain analysis of multiple different traits of tone and/or sentiment with a scoring for each trait. The graph reader may reference multiple graphs each having edges between the nodes for a tone weighting for one of the multiple traits.

The tone obtaining component for obtaining analysis of the tone of the text content may call a web or cloud service for tone analysis.

The graph analyzer may include a filtering component for analyzing a subset of the entities based on one or more of the group of: geographic location, hierarchical relationship, departmental or organizational relationship, time period of communications, and metadata of the tone weighting.

The system may be provided as a cloud service to an organization wherein a component local to the organization sends messages to the cloud service.

According to a further aspect of the present invention there is provided a computer program product for message tone evaluation between entities in an organization, the computer program product comprising a computer readable storage medium having program instructions embodied therewith, the program instructions executable by a processor to cause the processor to: extract text content for the message or group of messages and obtain analysis of the tone of the text content; reference a graph in which nodes represent entities in the organization and edges between the nodes have tone weightings for a tone for a communication relationship between the entities; update the graph with a tone weighting for the intercepted message or group of messages by setting or updating an edge tone weighting between the nodes for the sender entity and the recipient entity; and analyze the graph to obtain analysis of one or more entities of the organization and the tone weightings of their communication relationships.

The described aspects of the invention provide the advantage of obtaining insights into the tone of communication between entities by building and maintaining a workplace interaction graph.

The described methods and systems provide analysis of communications between communication entities of an organization. The analysis evaluates the tone of the content of communications between communication entities. The tone analysis is then entered in an interaction graph of the organization as relationship tone weightings between entities that may be updated as more communication data becomes available.

The interaction graph may be provided with nodes representing the communication entities in the organization and with edges between the nodes having tone weightings for a tone of a communication relationship between the entities. The graph may be analyzed to obtain insight into the mood, manner and/or attitude of one or more communication entities determined by one of their communications.

An organization may be defined as any group, association, or body, which includes communication entities as defined below. The organization may include individuals, groups of individuals, or roles performed by various individuals all belonging to the organization, employed by the organization, or otherwise overseen by the organization. The organization may be structured with any suitable organizational structure. As examples, the organization may include a corporate organization, an institution, an association, etc.

A communication entity may be any entity that sends and receives communications in the organization. This may be an individual person, a group of people, or an entity for which a communication contact name or address is provided. For example, an entity may include a service or information address for an organization that is monitored and used by various different people, or an address for a role carried out by different people. In another example, the entity may be an individual employee of the organization.

Communications may be any form of communication in which text content is provided including, but not limited to, email communication, instant messaging communication, short message service (SMS) communication, online forum communication, etc. In addition, communications may be audio communications in which text content may be derived by audio transcript.

The communications may be analyzed as individual communication messages, in threads, in conversations, or in other groupings of communications with the same sender and recipient, for example, multiple messages over a period of time. The types of communication may be personal, business related, organizational, external, etc.

The methods and systems may analyze the tone using a tone analysis tool or may obtain analysis from a service for messages or conversations from a first entity to a second entity in order to obtain an evaluation of different metrics. The term "tone" is used in a broad sense to include tone types of emotions, social tendencies, and writing styles, as well as sentiment of positive and negative sentiments.

Figure 1:
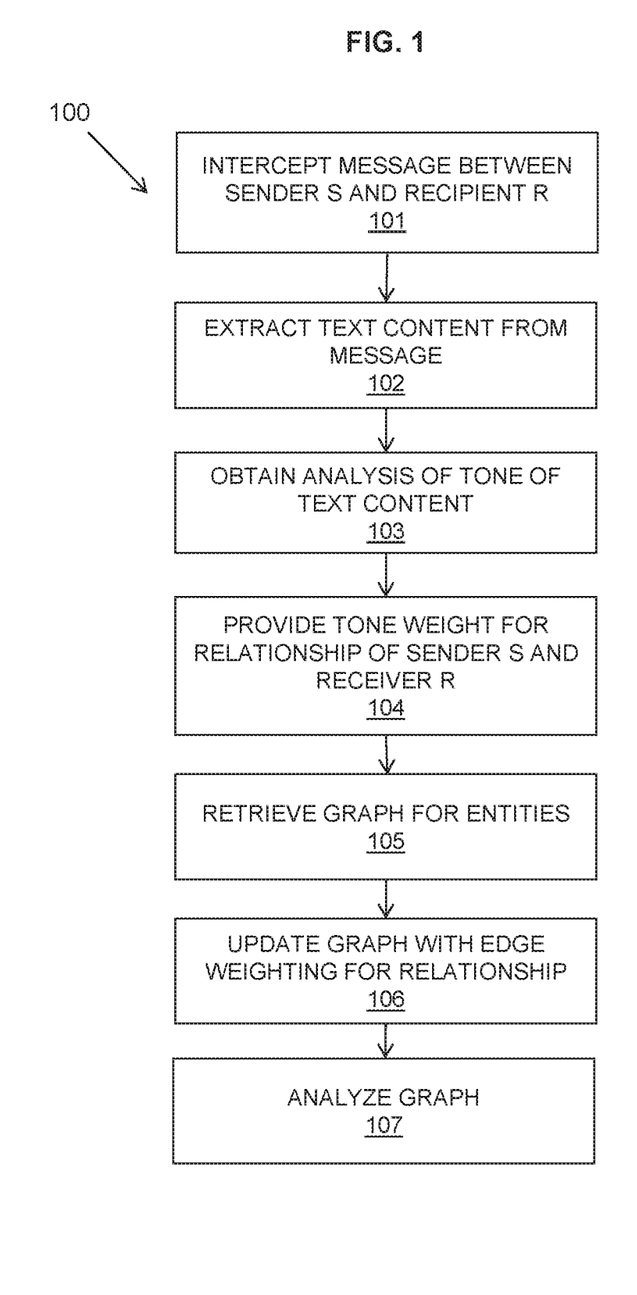
FIG. 1 is a flow diagram of an example embodiment of a method in accordance with the present invention.

Referring to FIG. 1, a flow diagram 100 shows an example embodiment of the described method.

A communication message or a group of messages may be intercepted 101 between a sender entity S and a recipient entity R. As mentioned above, the sender and recipient entities are communication entities that may comprise, for example, an individual, a group of people with a common communication address, or a role with a communication address that is carried out by changing personnel. The communication messages may be any form of communication including text content or with derived text content that are capable of being intercepted either as individual messages or as a group of messages between two entities, such as a thread or conversation.

The text content of the message or group of messages may be extracted 102, for example, by discarding message headers and signatures to extract the text content forming the substance of the message. A message may be an audio message from which a text transcript is obtained and extracted.

Tone analysis of the extracted text content may be obtained 103, which may include analysis of sentiment as well as tone types. The tone analysis may be carried out locally or may be provided by an external service, such as a web service.

Various analytical tools are known which may be used for tone or sentiment analysis. For example, the Watson Tone Analyzer service offering uses linguistic analysis to detect and interpret emotional, social, and language cues found in text without need of training. As another example, a Natural Language Classifier may be trained in order to identify to which class a message belongs, based on a predefined set of possible tones or emotions.

The actual content of messages may be discarded and not stored after tone analysis has taken place to extract the required metrics. This may be required to uphold privacy requirements for messages. The results of the tone analysis may be stored and used for further analysis of the metrics.

Each message or group of messages shared between two communication entities may be analyzed in order to derive the tone and/or sentiment (for example, positive, negative, aggressive, scared, depressed) associated with it.

The tone analysis may derive a single value that ranges from positive to negative indicating a tone. A single overall tone may be analyzed which may be configured to represent the mood or attitude that is to be monitored.

In an alternative embodiment, different types of tone and sentiment referred to as traits may be extracted and analyzed. The use of different traits, including personality traits or emotions such as, for example, anger, openness, etc., may provide data to compute a single aggregated value. In another embodiment, the analysis of different traits may be provided as separate values for further analysis.

The results of the tone and/or sentiment analysis may be provided and used to provide 104 one or more tone weighting for the relationship between the sender entity S and the receiver entity R. Each tone weighting may be a uni-directional relationship weighting indicating a tone weighting for the communications generated by the sender entity S and sent to the receiver entity R. In some embodiments, a bi-directional relationship weighting may be obtained if a conversation between the two entities is analyzed.

A tone weighting for a relationship may be formatted for further use. This may include a tone weighting for a relationship also including metadata relating to the relationship. Basic metadata may include, for example, date and location tags, as well as the medium used for the interaction. This metadata helps with additional metrics and analysis by recognizing other factors, which may be influencing the tone. For example, messages sent at late hours or messages sent using mobile devices may influence the tone of the message sent by the entity. A reference to each entity involved in the interaction may also be kept, in order for then provide the analysis tool to reuse entity information optionally mapped to employee information that the company holds.

A graph may be retrieved 105 for data representation for an organization having nodes of communication entities and edges of relationships between the communication entities. The graph may show directional relationships of the edges and, optionally, bi-directional relationships. The graph may be updated 106 with the new tone weighting for a relationship. This may be updated by inserting a first weighting for an edge, or updating an existing edge score by combining the new tone weighting into an existing tone score.

As a first option, a basic arithmetic mean may be considered as a sum of all tone weightings between the entities divided by their number. As a further option, a weighted arithmetic mean may consider a measurement of one or more additional features or information relating to the communication. For example, the feature may be the length of the message from which the value is being derived, and the weighted arithmetic mean may be obtained by multiplying the tone weighting by the length of the message and then computing the average. A combination of additional features may also be used for the weighting. Metadata associated with the tone weightings may be used in a weighted arithmetic mean.

The inclusion of different traits as different measurements may require a more complex graph system, where different edges are built based on the trait they are referring too.

A further embodiment may include building separate independent graphs for each chosen trait, the results of which may be analyzed and combined as required.

Each graph may use a single real value for each edge, a value representing the strength/weakness of the measured tone or trait. As an example for the basic case a value of −1.0 indicates a completely negative interaction, while 1.0 implies a completely positive one.

If a measure is provided of the trait of "openness" to determine how open the interaction is ("openness" as defined on the Watson Personality Insight service), a lower limit implies complete closedness and upper limit implies complete openness.

The analysis may provide a one-way relationship, from entity A to entity B, from entity B to entity A, as it is based on the scoring of the messages sent from one to the other and vice-versa.

An average or balanced two-way relationship score may be computed based on the single direction scores. An entity that has a negative interaction with another entity, which in turn seems to keep a good interaction with the same, would balance out as a neutral two-way relationship. The same concept may be applied to bigger groups, from teams to departments. However, a granular one-way relationship score is required in order to derive and find specific problem or advantage points based on individual entities.

The graph may be analyzed 107 to obtain information on the tones used by the communication entities.

Once a sufficient number of messages have been analyzed, it is possible to compute the overall or partial graph quality, based on a weighted average of the edges' values.

The edge values may be analyzed for one or more communication entities. The edge values provide an indicator of the organization or a portion of the organization's communication relations' quality.

The metadata associated with tone weightings of relationships between entities may be used for filtering the analysis of the graph.

Additional metrics may be derived from analysis of the graph, for example, by limiting to a workplace or geographic location of a subset of the communication entities in the graph. Workplace metrics may be obtained including communication quality, positive and negative inclinations, stress levels, etc.

Analysis of the graph may also be limited to a time period which may illustrate degradation or improvement of local or overall quality over time, for example based on comparison between different timeframes, forecasting and impact-evaluation of administrative or logistic changes.

Analysis of the graph may also provide group metrics that may identify conflicts and quality of interaction between people or teams.

Analysis of the graph may further include single individual metrics including the level of positivity or negativity generated by a single person among other peers.

Figure 2:
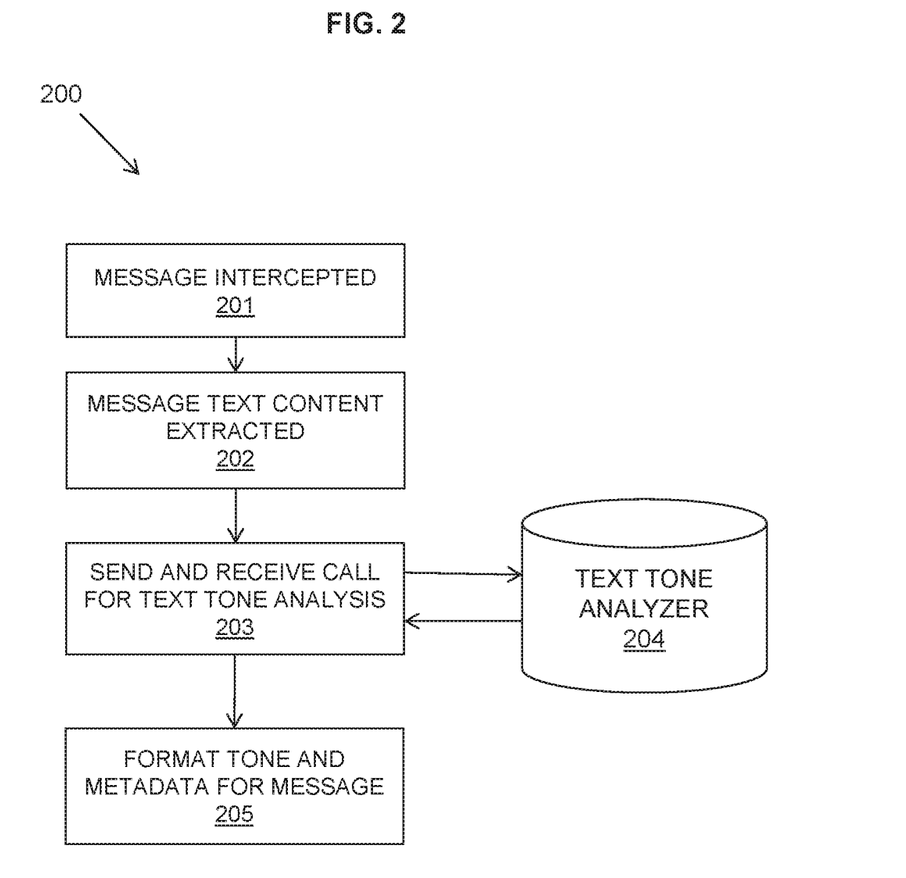
FIG. 2 is a flow diagram of an example embodiment of an aspect of a method in accordance with the present invention.

Referring to FIG. 2, a flow diagram 200 shows an example embodiment of an aspect of the described method. A message or group of messages may be intercepted 201 and the message text content extracted 202 as previously described in relation to FIG. 1.

The method may include sending and receiving 203 a call for a text tone analysis by an external service in the form of a text tone analyzer 204. This may use a representational state transfer (REST) call to a web or cloud service.

An example, using Watson Tone Analyzer service, sends the textual context of the message with no other metadata needed. A reply from the service includes real values ranging from 0 to 1 for different traits such as anger or openness. This may then be kept and used at later stages.

The received text tone analysis may be formatted 205 as a tone weighing and metadata for the message or messages added, if required.

A tone weighting for a relationship may also include metadata relating to the relationship. The metadata may include, for example, date and location tags, as well as the medium used for the interaction. This metadata helps with additional metrics and analysis by recognizing other factors, which may be influencing the tone. A reference to each entity involved in the interaction may also be kept, in order for then provide the analysis tool to reuse entity information optionally mapped to employee information that the company holds.

Figure 3:
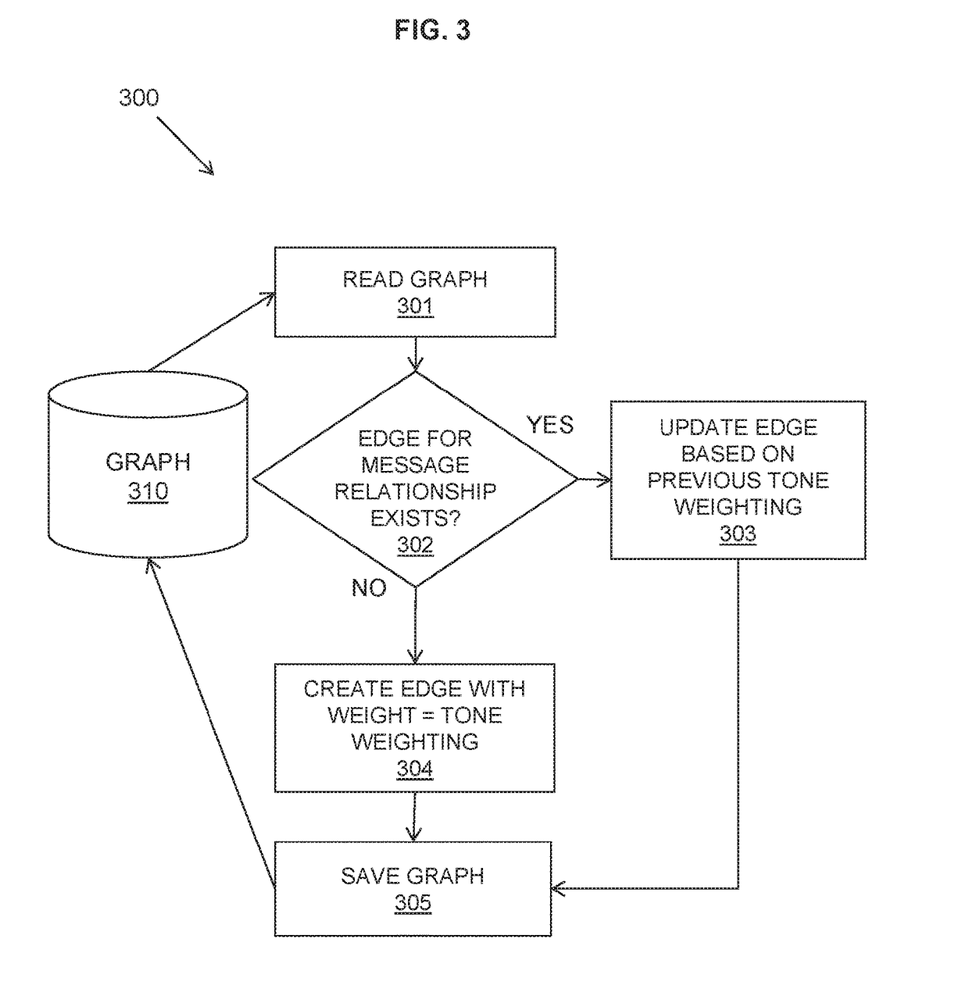
FIG. 3 is a flow diagram of an example embodiment of an aspect of a method in accordance with the present invention.

Referring to a flow diagram 300 shows an example embodiment of an aspect of the described method. A graph 310 for an organization may be read 301. This may be a previously generated and stored graph 310 for the organization in which the communication entities of the organization are represented as nodes.

It may be determined 302 if an edge relationship exists in the graph 310 for the relationship of a current message or group of messages. If an edge does exist, it may be updated 303 based on the previous relationship tone weighting and the new tone weighting. The graph 310 with the updated relationship tone weighting may be saved 305.

If it is determined 302 that no relationship edge exists for relationship of the current message or group of messages, an edge may be created 304 and a tone weighting set as the tone weighting of the current message or group of messages. The graph 310 with the new relationship tone weighting may be saved 305.

In a specific example, the initial setup of a graph may be a clean directed graph where each node corresponds to communication entity. When a message is intercepted between two entities, for example, employee_A and employee_B, it is analyzed to obtain the corresponding tone. There are two cases for each message.

1. No edge exists between employee_A and employee_B: a new edge is created, and the tone of the message is set as its attribute.

2. An edge already exists between employee_A and employee_B: the current attribute of the edge is updated based on the tone of the new message.

Each new message may adjust the value associated with an edge. This provides an intuitive update of the edge attributes. This value may, for example, represent how positive the interaction is between employee_A and employee_B (the two nodes of the edge), a negative message may reduce this value, and a positive one may enforce it. The graph may be directed, so it is possible to differentiate between how employee_A interacts with employee_B, and how employee_B interacts with employee_A.

Figure 4A:
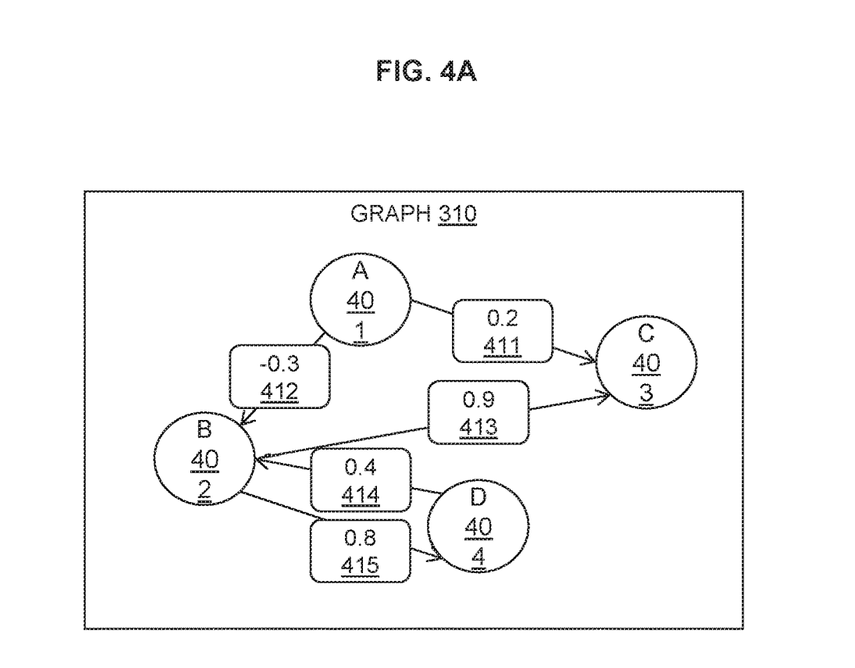
FIGS. 4A and 4B are schematic diagrams showing an example embodiment of a graph used in accordance with the present invention.
Figure 4B:
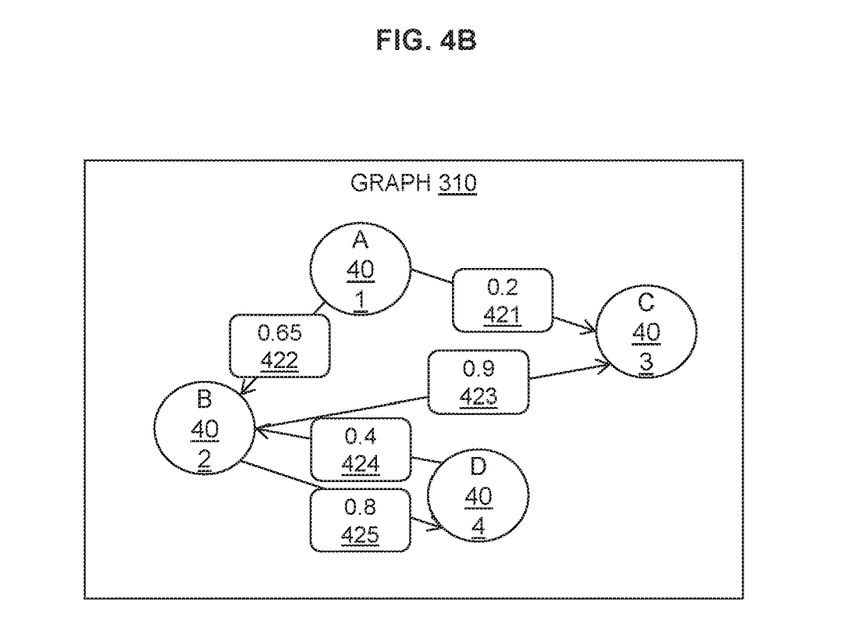

Referring to FIGS. 4A and 4B, schematic diagrams are provided showing an example embodiment of a graph 310 before and after a new message interception.

The graph 310 includes nodes 401-404 representing communication entities A to D. Edges 411-415 are provided as directional links between the nodes 401-404. Each edge 411-415 may have a tone weighting showing a tone weighting for the messages between the communication entities.

In FIG. 4A, the graph 310 shows positive tone weightings:

for edge 411 from node A 401 to node C 403, a weighting of 0.2;

for edge 413 from node B 402 to node C 403, a weighting of 0.9;

for edge 414 from node D 404 to node B 402, a weighting of 0.4; and for edge 415 from node B 402 to node D 404, a weighting of 0.8.

Edge 412 from node A 401 to node B 402 has a negative tone weighting of −0.3.

In FIG. 4B, the graph 310 has been updated to show a new tone weighting for edge 412 from node A 401 to node B 402 of 0.65. This has resulted from a positively toned communication being intercepted and evaluated and the tone weighting updated as edge 422.

FIG. 4B represents the interaction graph transition after the interception of a message between employee A and employee B. FIG. 4A shows the initial state of the graph, FIG. 4B shows the resulting state after the update. It is noted that by averaging the extracted tone value, the edge A→B now has a positive weight.

The tone weightings may be provided from multiple different types or traits of tone and/or sentiment. For example, the tone weighting may be for a range of a given emotion, social tendency, writing style, sentiment, etc. This may enable the graph to be filtered and analyzed further.

In the case of a communication entity being an individual, the metrics obtained by the analysis may include the following.

Level of comfort or discomfort of an employee in the work environment based on the emotions reflected through the communication channels.

Level of positive or negative impact an employee generates among other peers based on the emotions reflected.

Level of collaboration with other peers that will allow creation of more effective teams or squads.

The system may be used by human resource sectors in order to capture a detailed and significant picture of an organization, amongst other things, identify trends, identify and locate problems as well as investigate the impact of logistic or organizational changes.

In addition, the system may be used by managers to evaluate the tone of messages being sent externally to an organization or internally within an organization.

Direct questioning or surveying of employees regarding their mood, manner or attitude often provides biased views and feedback. This may be unintentional due to an employee's perception of a situation. On the other hand video or audio monitoring may be intrusive, and often requires third party human operators to analyze such data resulting in privacy concerns. The described solution enables interaction tone to be derived from textual messages and audio transcripts, minimizing or eliminating the need to store personal information or involve the intervention of human operators, while providing an accurate view of a work environment atmosphere and employees' wellbeing. The actual content of the exchanged messages that is the most privacy-sensitive data is discarded as soon as the tone extraction has taken place, with only the results actually stored in a system and used for analysis.

Figure 5:
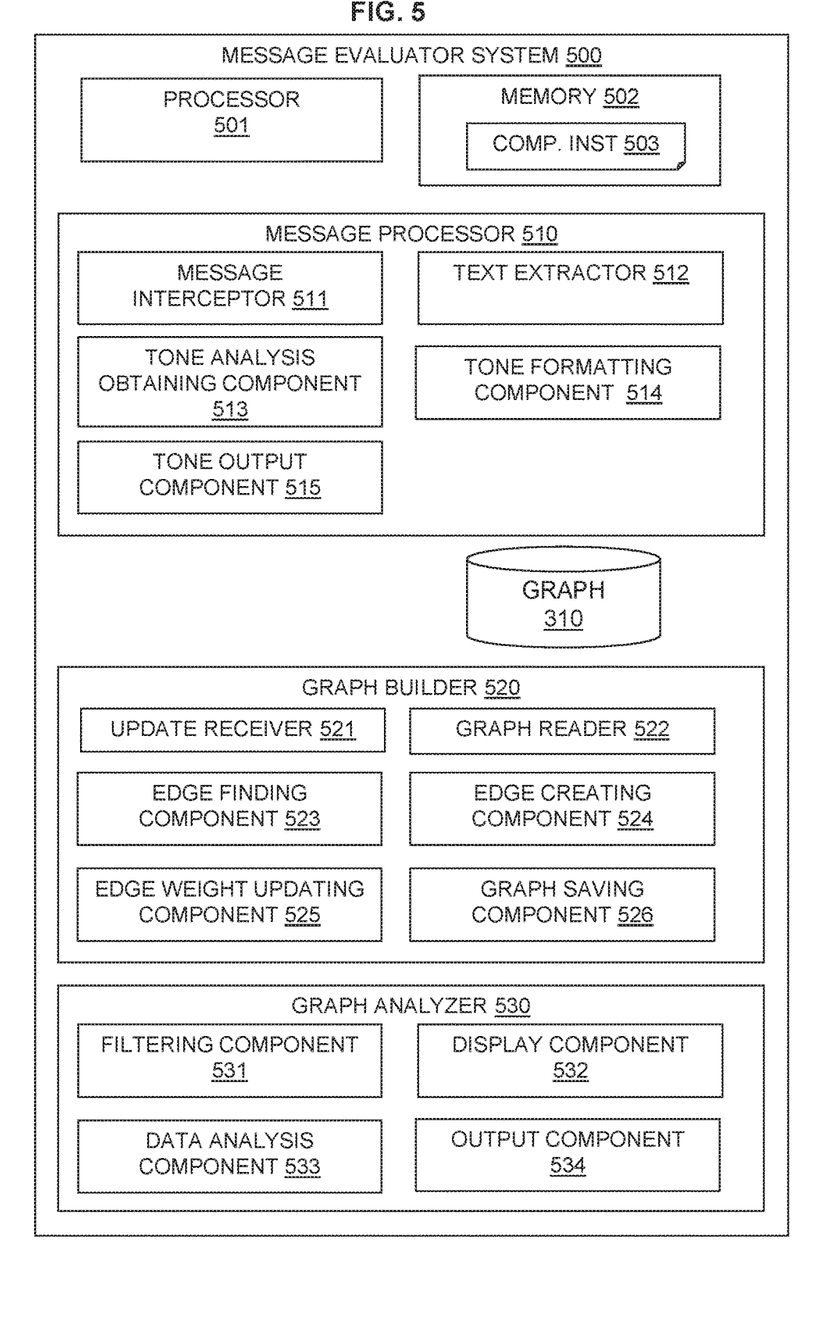
FIG. 5 is block diagram of an example embodiment of a system in accordance with the present invention.

Referring to FIG. 5, a block diagram shows an example embodiment of the described system in the form of a message evaluator system 500.

The message evaluator system 500 may include at least one processor 501, a hardware module, or a circuit for executing the functions of the described components which may be software units executing on the at least one processor 501. Multiple processors running parallel processing threads may be provided enabling parallel processing of some or all of the functions of the components. Memory 502 may be configured to provide computer instructions 503 to the at least one processor 501 to carry out the functionality of the components.

The message evaluator system 500 may be provided as a service to an organization, for example, as a network service or cloud service. Alternatively, the message evaluator system 500 may be provided as an internal process at a location of the organization.

In one embodiment, the message evaluation system 500 may be provided as a cloud solution. An organization may setup an independent component that sends messages directly to a message interceptor 511. The interceptor 511 may act as a REST interface, receiving messages with metadata and computing internally all the analysis. The access to this internal state may then again be provided via a REST interface of a complete user interface.

In another embodiment, the message evaluation system 500 may be provided as local solution. The organization may have a centralized system for the handling and storage of internally exchanged messages such as emails, instant messaging etc. In such a situation the centralized system may be associated with a message interceptor 511. For other situations where there is no centralized system, a message interceptor 511 may be configured to access one or more channels of communication.

In both these scenarios, the message evaluator system 500 may include a message processor 510 for processing messages before providing data to a graph builder 520 which may be analyzed by a graph analyzer 530. In FIG. 5, these components are shown as part of the message evaluator system 500; however, it may be envisaged that these are provided on separate processor systems, for example, in communication via a network.

The message processor 510 may include or be in communication with a message interceptor 511 for intercepting messages between communication entities in the organization. The message interceptor 511 may intercept different types of message sent via different communication channels, such as email, instant messaging, etc. by monitoring a communication server. The message interceptor 511 may intercept every message, or may aggregate messages sent over a period of time, or may intercept occasional messages to obtain an overview of communications in the organization.

The message processor 510 may include a text extractor 512 for extracting the text content from the intercepted messages. This may exclude non-text content data and formatting. The text extractor 512 may include deriving text content from audio communications.

The message processor 510 may include a tone analysis obtaining component 513 for obtaining tone analysis of the extracted text content. For example, this may be by using a tone analysis service external to the message processor 510 such as a web or cloud service.

The result of the tone analysis obtaining component 513 may be provided to a tone formatting component 514 for formatting the obtained tone into a format for use by the graph builder 520 including appropriate metadata relating to the communication from which the tone has been extracted. The tone formatting component 514 may translate the obtained tone analysis into a format suitable for adding to a graph 310. For example, if the graph 310 includes a single tone weighting value for each relationship, the format may be a value for the tone weighting and any associated metadata relating to the intercepted message or messages. In another example, if the graph 310 is more complex and relates to multiple traits of tones, then a tone attribute and value for each attribute may be formatted, again with any associated metadata for the message or messages. The message processor 510 may include a tone output component 515 for outputting the formatted relationship tone to a graph builder 520, for example, this may export the formatted tone weightings for intercepted messages.

The graph builder 520 may build and update a graph 310 for an organization. The graph 310 may be stored locally at the message evaluator system 500 or may be stored elsewhere in the organization's network. The graph builder 520 may include an update receiver 521 for receiving a communication tone update from the message processor 510. The graph builder 520 may include a graph reader 522 for reading the graph 310 for the organization from a stored location.

The graph builder 520 may include an edge finding component 523 for finding an edge in the graph 310 relating to the relationship of the intercepted message and an edge creating component 524 for creating an edge for the relationship of the intercepted message if it does not already exist. The graph builder 520 may include an edge weight updating component 525 for updating the graph edge with the formatted relationship tone and a graph saving component 526 for saving the updated graph 310. The edge weight updating component 525 may use an average or weighted average for updating the tone weightings by averaging the new tone weighting with previous tone weightings.

The graph builder 520 may use aggregated tone weightings for combining different traits of tone and/or sentiment. Alternatively, the graph builder 520 may build multiple related graphs showing tone weightings for different traits of tone and/or sentiment for the same communication entities of an organization.

The graph analyzer 530 may include a filtering component 531 for filtering the display or analyzed data of the graph 310. The filtering component 531 may filter the graph data by restricting to one or more communication entity nodes, or a subset of the nodes. The filtering component 531 may also filter by type of tone weighting of the graph edges, or by using metadata associated with the tone weightings.

The graph analyzer 530 may include a display component 532 for displaying the filtered or analyzed data. The graph analyzer 530 may also include a data analysis component 533 for further analyzing the filtered data and an output component 534 for outputting the results of the analysis.

Figure 6:
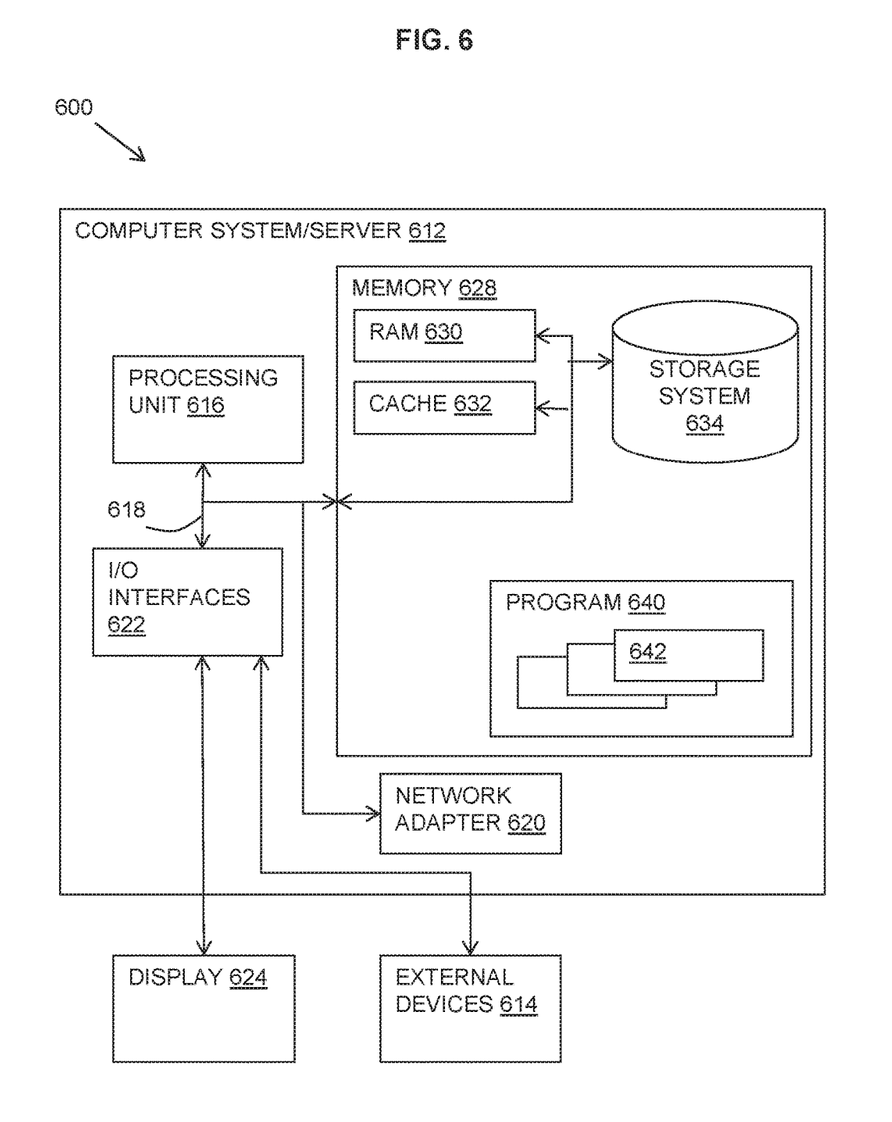
FIG. 6 is a block diagram of an embodiment of a computer system or cloud server in which the present invention may be implemented.

Referring now to FIG. 6, a schematic of an example of a system 600 in the form of a computer system or server is shown in which the present system may be implemented.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard. Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk chive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules; and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device; a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
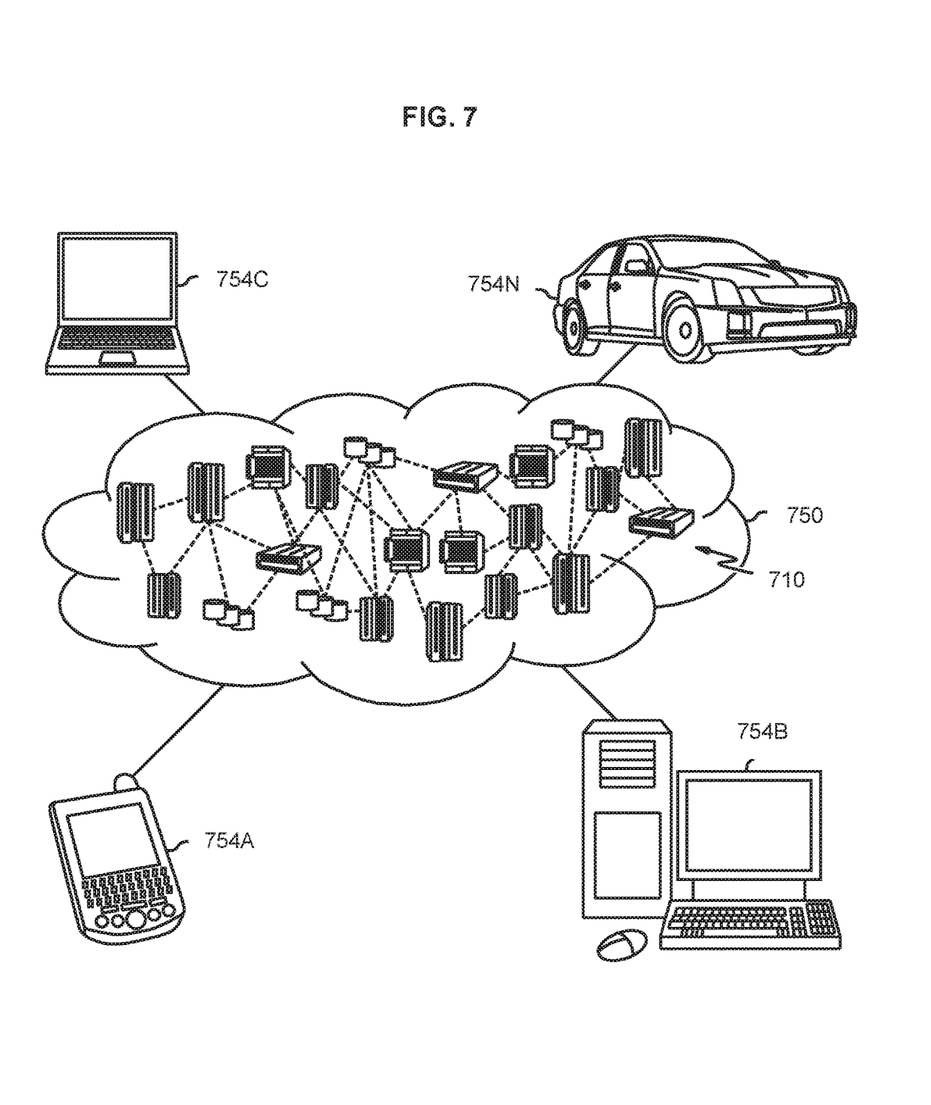
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
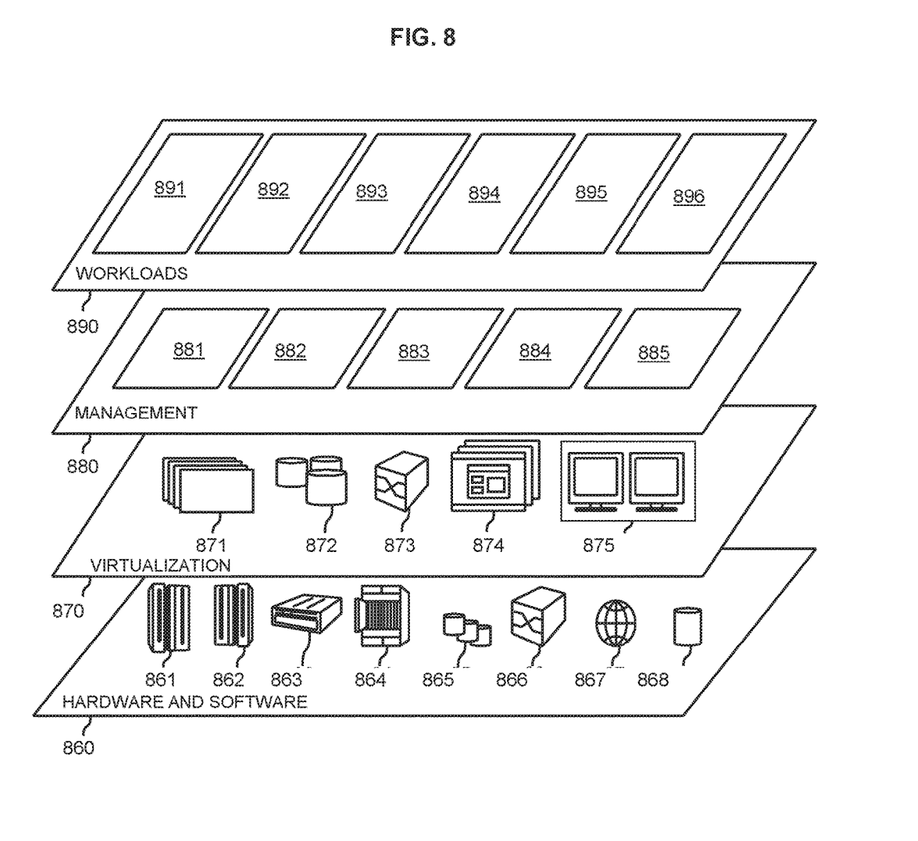
FIG. 8 is a diagram of abstraction model layers of a cloud computing environment in which the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873; including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and message tone evaluation processing 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

The invention claimed is:

1. A method for message tone evaluation between entities in an organization, the method comprising:
intercepting a message or a group of messages between a sender entity and a recipient entity in an organization;
extracting text content for the message or group of messages;
performing analysis of a tone of the extracted text content, wherein the tone comprises emotions, social tendencies, writing styles and sentiment of positive and negative sentiments;
providing a tone weighting for a communication relationship between the sender entity and the recipient entity based on the analysis of the tone of the extracted text content;
retrieving a graph in which nodes represent entities in the organization and edges between the nodes have tone weightings for a tone for a communication relationship between the entities, wherein the tone weightings comprise a numerical value;
updating the graph with the tone weighting for the intercepted message or group of messages by setting or updating an edge tone weighting between the nodes for the sender entity and the recipient entity;
analyzing the updated graph to obtain information on the tones used by the sender entity and the recipient entity; and
capturing an insight into an interaction tone of the organization based on the analysis.

2. The method as recited in claim 1, wherein the sender entity and the recipient entity are a communication entity having a communication address within the organization, wherein the sender entity and the recipient entity comprise one of the following: an individual, a group of individuals, or a role in the organization which has a communication address.

3. The method as recited in claim 1, wherein the tone weighting includes metadata relating to the communication relationship between the sender entity and the recipient entity, wherein the updating of the graph with the tone weighting includes updating the graph with the metadata to enable filtering of the graph, wherein the metadata comprises date and location tags as well as a medium used for interaction, wherein the metadata helps with additional metrics and analysis by recognizing other factors influencing the tone.

4. The method as recited in claim 1, wherein the tone weighting for the intercepted message or group of messages is for a single direction of communication relationship.

5. The method as recited in claim 1, wherein the tone weighting for the intercepted message or group of messages is for a two-way direction of communication relationship.

6. The method as recited in claim 1, wherein the updating of the edge tone weighting averages tone weightings of multiple messages or groups of messages intercepted from the sender entity to the recipient entity.

7. The method as recited in claim 6, wherein the updating of the edge tone weighting provides a weighted average tone weighting weighted by a measurement of one or more features of the message or group of messages.

8. The method as recited in claim 1, wherein the performing of the analysis of the tone of the extracted text content obtains analysis of a single generalized tone with a scoring ranging from positive to negative.

9. The method as recited in claim 1, wherein the performing of the analysis of the tone of the extracted text content obtains analysis of multiple different traits of tone and/or sentiment with a scoring for each trait.

10. The method as recited in claim 9 further comprising:
referencing multiple graphs each having edges between the nodes for a tone weighting for one of the multiple traits.

* * * * *